and on fan speed. fan speed input is used for determining battery pack temperature and thermal leakage. 
United States Patent Wang et al.

(10) Patent No.: US 10,086,718 B2
(45) Date of Patent: Oct. 2, 2018

(54) SYSTEM AND METHOD FOR OPERATING A BATTERY PACK

(71) Applicant: Ford Global Technologies, LLC, Dearborn, MI (US)

(72) Inventors: Xu Wang, Dearborn, MI (US); Chuan He, Northville, MI (US); Xiaoguang Chang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 14/054,710

(22) Filed: Oct. 15, 2013

(65) Prior Publication Data

US 2015/0104680 A1   Apr. 16, 2015

(51) Int. Cl.

| B60L 11/18 | (2006.01) |
| H01M 10/48 | (2006.01) |
| B60L 1/00 | (2006.01) |
| H01M 10/617 | (2014.01) |
| H01M 10/625 | (2014.01) |
| H01M 10/44 | (2006.01) |

(52) U.S. Cl.
CPC ........... *B60L 11/1874* (2013.01); *B60L 1/003* (2013.01); *B60L 11/1857* (2013.01); *B60L 11/1872* (2013.01); *B60L 11/1877* (2013.01); *H01M 10/486* (2013.01); *H01M 10/617* (2015.04); *B60L 2240/545* (2013.01); *B60L 2240/547* (2013.01); *B60L 2240/549* (2013.01); *H01M 10/443* (2013.01); *H01M 10/625* (2015.04); *H01M 2220/20* (2013.01); *Y02T 10/7005* (2013.01); *Y02T 10/705* (2013.01)

(58) Field of Classification Search
CPC ........... H01M 10/486; H01M 10/5016; H01M 10/625; H01M 10/617; H01M 2220/20; H01M 10/443; B60L 11/1874; B60L 11/003; B60L 11/1857; B60L 10/625; B60L 2240/545; B60L 2240/547; B60L 2240/549

See application file for complete search history.

(56) References Cited

U.S. PATENT DOCUMENTS

| 5,711,605 A | 1/1998 | Reher et al. |
| 6,377,880 B1 * | 4/2002 | Kato ..................... B60K 6/485 |
| | | 180/65.26 |

(Continued)

FOREIGN PATENT DOCUMENTS

| DE | 102009037088 A1 * | 2/2011 | .......... H01M 10/486 |
| WO | WO 2011021101 A1 * | 2/2011 | .............. H01M 8/04 |

OTHER PUBLICATIONS

English translation of DE102009037088: DE102009037088_translate. pdf (Feb. 2011).*

*Primary Examiner* — Michael L Dignan
(74) *Attorney, Agent, or Firm* — David Kelley; McCoy Russell LLP

(57) ABSTRACT

Systems and methods for operating a battery pack supplying power to propel a vehicle are disclosed. One example method comprises, determining a difference between an estimated battery pack temperature and a sensed battery pack temperature as a basis for adjusting battery pack output power. The method also includes adjusting a speed of a cooling fan based on the difference between estimated battery pack temperature and sensed battery pack temperature.

6 Claims, 4 Drawing Sheets

(56) References Cited

U.S. PATENT DOCUMENTS

| | | | |
|---|---|---|---|
| 6,902,319 B2* | 6/2005 | Wu | G01K 17/20 |
| | | | 320/150 |
| 2006/0172188 A1* | 8/2006 | Okuda et al. | 429/120 |
| 2008/0299428 A1* | 12/2008 | Miyata et al. | 429/24 |
| 2010/0113216 A1* | 5/2010 | Avny | F16D 13/72 |
| | | | 477/76 |
| 2013/0110307 A1* | 5/2013 | Hensley | G06F 1/206 |
| | | | 700/300 |

\* cited by examiner

SYSTEM AND METHOD FOR OPERATING A BATTERY PACK

TECHNICAL FIELD

The present application relates to operating a battery pack supplying power to a vehicle.

BACKGROUND AND SUMMARY

Hybrid vehicles and electric vehicles may be powered or partially powered via a battery pack. The battery pack may be comprised of a plurality of battery cells that are in serial and/or parallel electrical communication with each other. The battery pack may operate most efficiently and/or provide a longer life cycle when it is within a predetermined temperature range. If a temperature of the battery pack is greater than the predetermined temperature range, the battery pack may degrade. On the other hand, if a temperature of the battery pack is less than the predetermined temperature range, battery pack output capacity may degrade as the battery's internal resistance increases. Further, when a battery operates a cold temperatures, its life cycle may be reduced due to irreversible chemical reactions that may occur inside battery cells. Therefore, it may be desirable to have a high degree of confidence in the battery's actual temperature.

One way to determine temperature of a battery pack is to install one or more temperature sensors within the battery pack. However, temperature sensors and temperature sensor wiring may degrade over time. One mode of battery temperature sensor degradation may be to indicate battery pack temperature is within a desired battery pack operating range while actual battery pack temperature is higher or lower than the desired battery pack operating temperature range. If the battery pack is at a temperature that is out of a desired battery pack operating range and the battery pack temperature sensor indicates that battery pack temperature is with the desired battery pack operating temperature range, it may be possible to demand more output from the battery pack than is desired based on battery pack temperature sensor output. Consequently, battery pack operation may degrade.

The inventors herein have developed a system for operating a battery pack of a vehicle, comprising: a battery pack including a temperature sensor; and a controller including non-transitory instructions for adjusting battery pack output power in response to a comparison of an estimated battery pack temperature and a battery pack temperature determined via the temperature sensor.

By comparing output of a battery pack temperature sensor to an estimated battery pack temperature, it may be possible to provide the technical result of limiting battery pack output power when a battery pack temperature sensor is in a degraded condition. In particular, if more than a predetermined temperature difference exists between a battery pack temperature based on temperature sensor output and an estimated battery pack temperature, battery pack output may be limited so as to reduce the possibility of battery pack degradation.

The present description may provide several advantages. In particular, the approach provides for a way to reduce the possibility of demanding more than a desired amount of current from a battery pack. Further, the approach may be performed without redundant temperature sensors. Additionally, the approach may reduce the possibility of battery pack degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
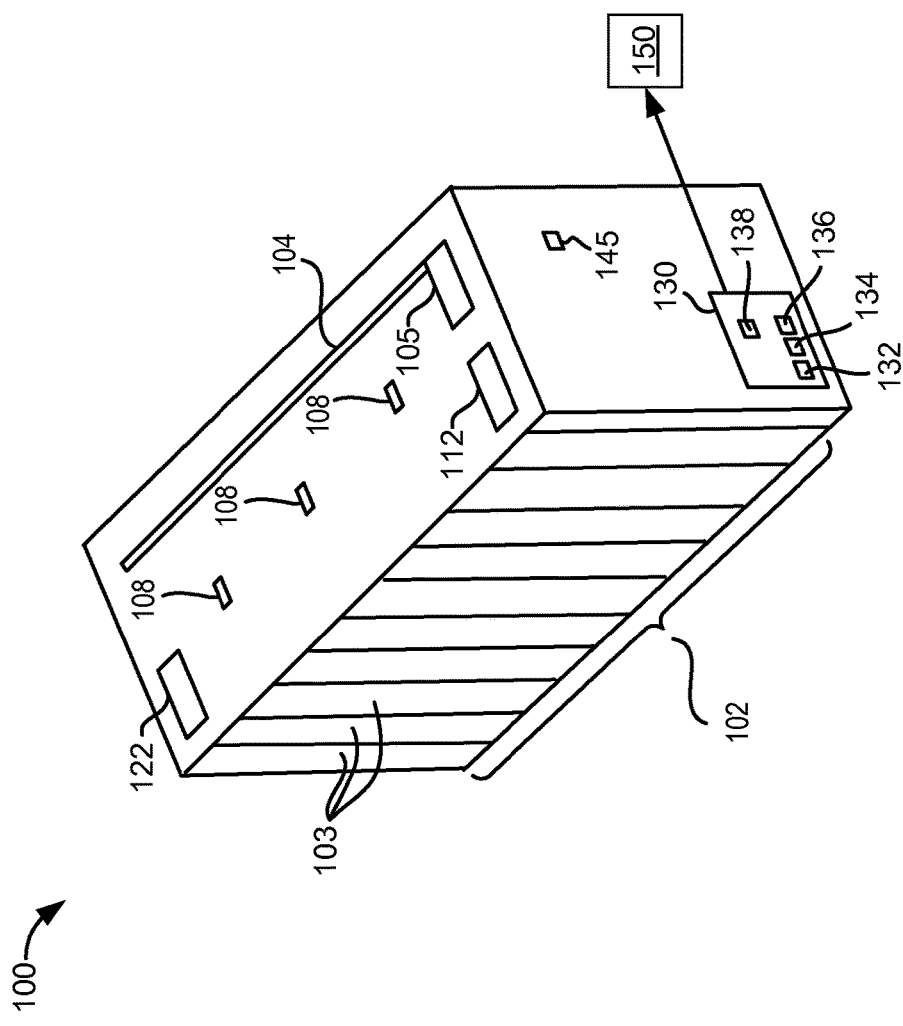
FIG. 1 shows a schematic view of a vehicle battery pack.
Figure 2:
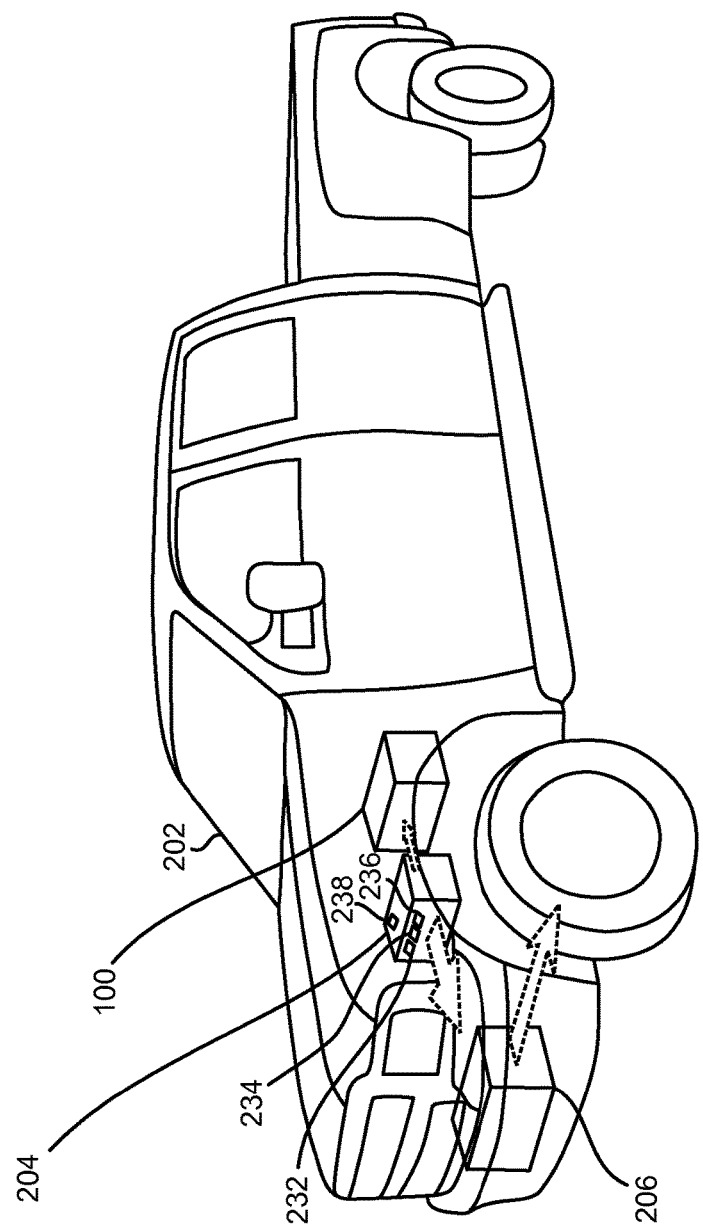
FIG. 2 shows a schematic view of a vehicle battery pack in a vehicle.

The present description is related to determining a condition of a degraded battery temperature sensor. The battery temperature sensor may be included in a battery pack as is shown in FIG. 1. The battery pack may supply electrical power to propel a vehicle as is shown in FIG. 2. The battery pack may operate according to the operating sequence shown in FIG. 3. A flowchart for operating a battery pack and estimating battery pack temperature is shown in FIG. 4.

Referring now to FIG. 1, an example battery pack 100 is illustrated. Battery pack 100 includes battery cell stack 102 comprised of a plurality of battery cells 103. Battery pack 100 may be air cooled by fan 112, or alternatively, liquid cooled via optional coolant circuit 104 and pump 105. Battery cells 103 may be lithium-ion, nickel-cadmium, or other known chemistries. Battery cells 103 may be electrically connected in series and/or parallel. Battery cells electrically connected in series increase battery pack output voltage. Battery cells electrically connected in parallel increase the battery capacity or amp-hour rating. Battery pack temperature may be sensed or measured via battery pack temperature sensors 108. In some examples, battery temperature sensors may be supplied for each/or several battery cells 103.

Battery fan 112 and/or pump 105 may be selectively activated and deactivated in response to battery pack temperature sensors 108. Further, a speed of rotation of battery fan 112 and/or pump 105 may be varied in response to battery pack temperature sensors 108. For example, if battery pack temperature is approaching a high temperature threshold, a speed of battery fan 112 and/or pump 105 may be increased. Alternatively, if battery pack temperature is decreasing and approaching a lower temperature threshold, a speed of battery fan 112 and/or pump 105 may be reduced.

During conditions when battery pack 100 is at lower temperatures, battery pack heating elements 122 may be activated to increase the temperature of battery pack 100. In one example, if battery temperature sensors 108 indicate a low battery temperature, heating elements 122 are activated to increase battery temperature so that battery efficiency may be increased.

Battery pack 100 also includes a battery controller(s) 130 including inputs and outputs 132. Battery controller 130 also includes non-transitory memory or read-only memory 134 for storing executable instructions. Battery controller 130 also includes volatile memory 136 for storing variables and instructions. Battery controller 130 also includes a central processing unit 138 that is in electrical communication with volatile memory 136, read-only memory 134, and inputs and outputs 132. Inputs and outputs 132 are in electrical communication with battery pack sensors and actuators (e.g., temperature sensor 108). Battery controller 130 is in electrical communication with user display or light 150 for indicating battery pack degradation. Battery controller 130 may also limit battery pack output power via limiting current through current limiting device 145 (e.g., transistor, thyristor, FET, MOSFET, etc.) Battery controller 130 also communicates with other vehicle controllers such as a vehicle or powertrain controller described in FIG. 2 as well as an electric motor controller, transmission controller, etc. The battery controller 130 may communicate with these other controllers to limit battery output power.

Referring now to FIG. 2, an example vehicle 202 in which battery pack 100 may be included is shown. Vehicle 202 may include a motor 206 to propel vehicle 202 and a vehicle controller 204. Alternatively, vehicle 202 may include motor 206, an engine (not shown), and a transmission (not shown). Motor 206 may be mechanically coupled to the engine and the transmission. In some examples, vehicle controller 204 may be a motor controller, transmission controller, etc. Vehicle controller 204 controls motor 206 or motor 206 and an engine in response to vehicle conditions and driver demand torque. Motor 206 is supplied electrical power via battery pack 100. In some examples, vehicle controller 204 may control both motor 206 and an optional internal combustion engine (not shown).

Vehicle controller 204 also includes inputs and outputs 232. Vehicle controller 204 also includes non-transitory memory or read-only memory 234 for storing executable instructions. Vehicle controller 230 also includes volatile memory 236 for storing variables and instructions. Vehicle controller 230 also includes a central processing unit 238 that is in electrical communication with volatile memory 236, read-only memory 234, and inputs and outputs 232. Inputs and outputs 232 are in electrical communication with battery pack controller 130 via a CAN bus, for example.

Thus, the system of FIGS. 1 and 2 provides for operating a battery pack of a vehicle, comprising: a battery pack including a temperature sensor(s); and a controller including non-transitory instructions for adjusting battery pack output power in response to a comparison of an estimated battery pack temperature and a battery pack temperature determined via the temperature sensor. The system further comprises additional instructions for indicating battery pack degradation in response to the comparison.

In some examples, the system includes where the comparison includes subtracting estimated battery pack temperature from the battery pack temperature determined via the temperature sensor or vice-versa. The system includes where the estimated battery pack temperature is based on battery pack fan speed. The system includes where the estimated battery pack temperature is further based on battery current and voltage. The system also includes where the estimated battery pack temperature is further based on battery pack thermal capacity. The system includes where battery pack output power is adjusted via a current limiting device.

Additionally, the system of FIGS. 1 and 2 provides for operating a battery pack of a vehicle, comprising: a battery pack including a temperature sensor; and a controller including non-transitory instructions for adjusting battery pack fan speed or cooling pump speed in response to a comparison of an estimated battery pack temperature and a battery pack temperature determined via the temperature sensor. The system further comprises additional instructions for adjusting battery pack output power in response to the comparison. The system includes where the comparison includes subtracting estimated battery pack temperature from the battery pack temperature determined via the temperature sensor or vice-versa. The system includes where battery pack fan speed or cooling pump speed is increased as estimated battery pack temperature approaches a battery pack operating range higher temperature threshold. The system includes where battery pack fan speed or cooling pump speed is decreased as estimated battery pack temperature approaches a battery pack operating range lower temperature threshold. The system includes where estimated battery pack temperature is based on an open circuit battery voltage.

Figure 3:
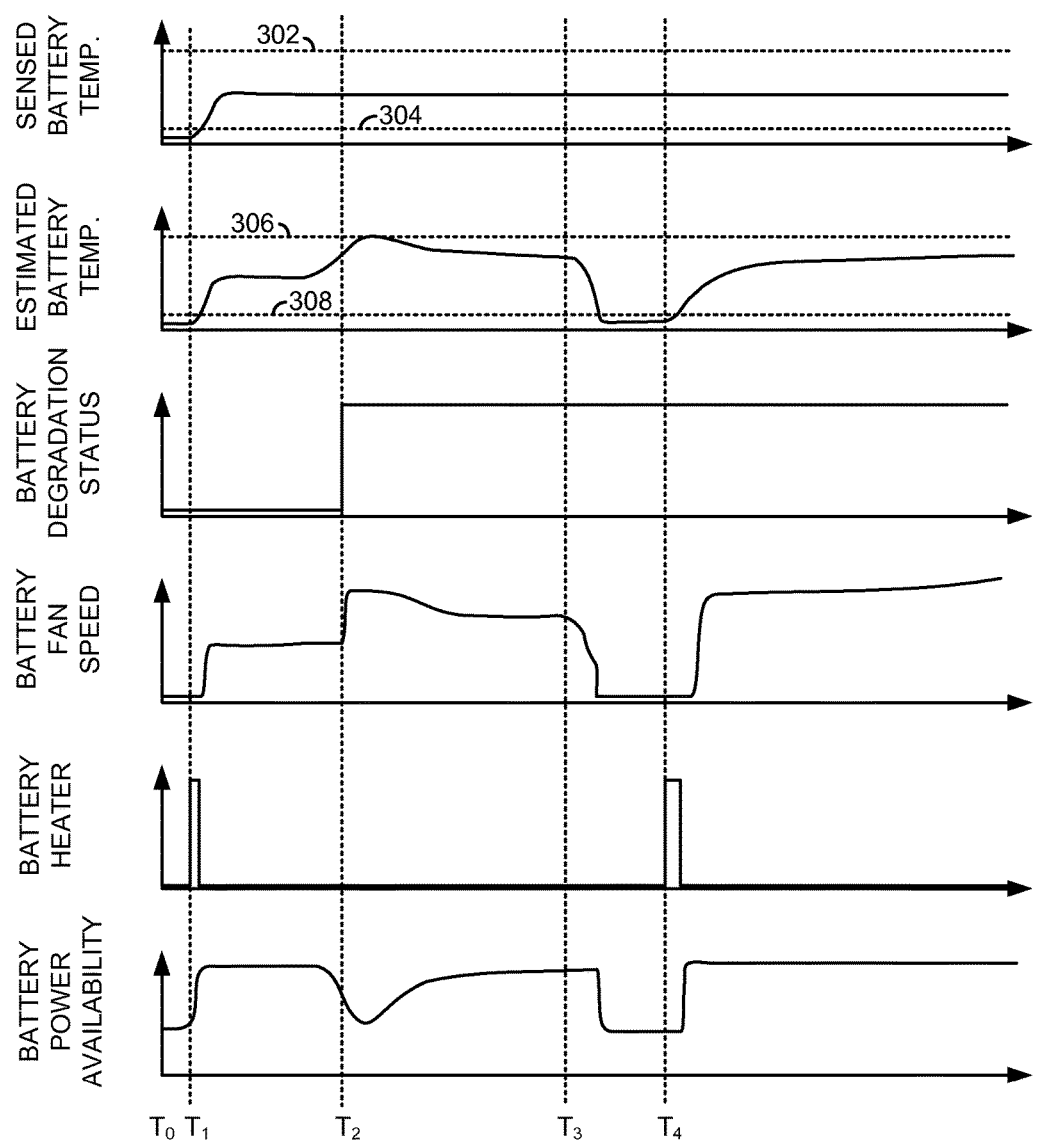
FIG. 3 shows an example battery pack operating sequence.
Figure 4:
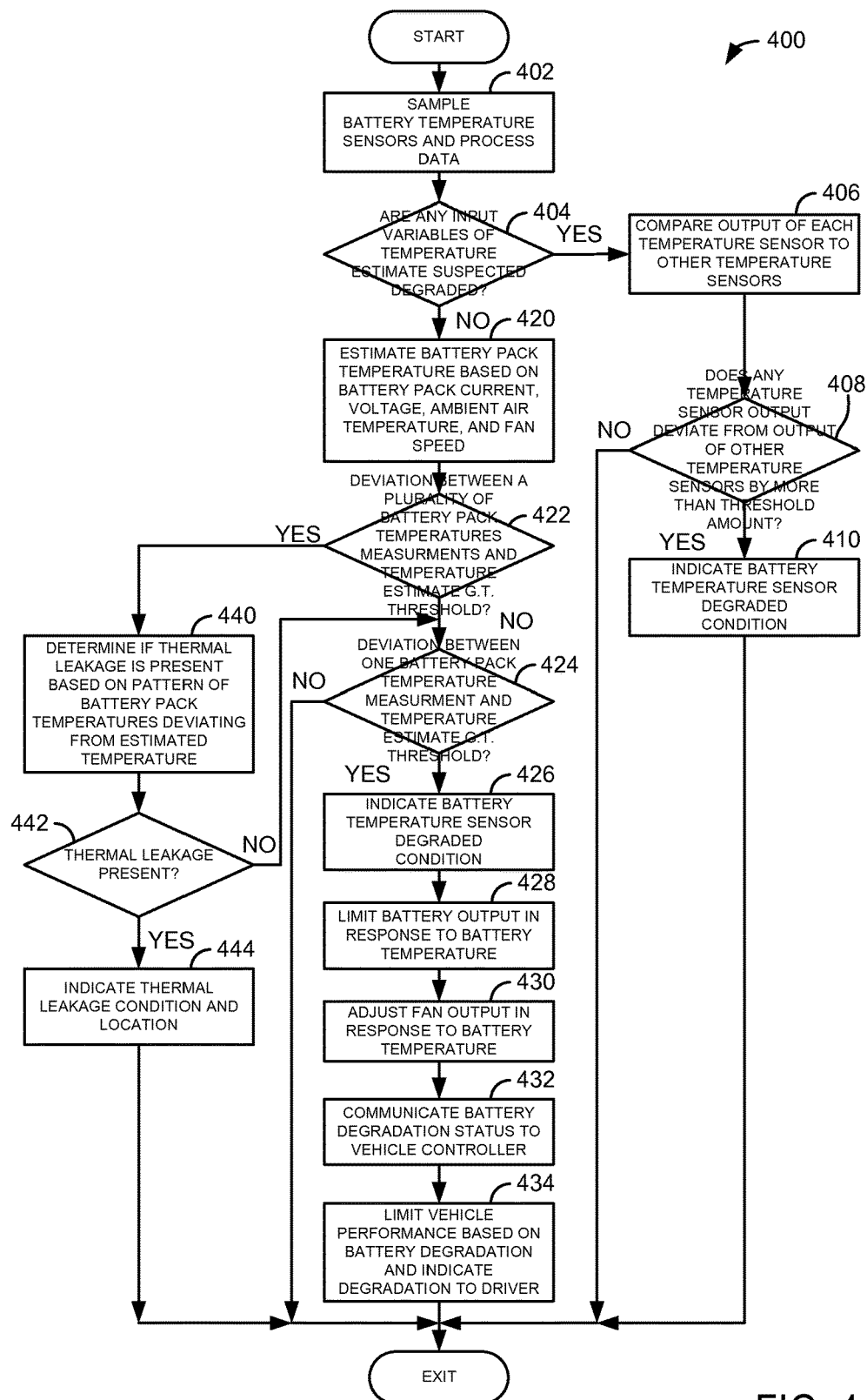
FIG. 4 shows a flowchart of a method for operating a battery pack.

Turning now to FIG. 3, an example prophetic battery pack operating sequence is shown. The battery operating sequence of FIG. 3 may be provided by the system shown in FIGS. 1 and 2. Further, the battery operating sequence may be the output of the method of FIG. 4. FIG. 3 includes vertical markers T0-T4 that show times of particular interest in the sequence.

The first plot from the top of FIG. 3 is a plot of sensed battery pack temperature versus time. The X axis represents time and time increases from the left to right side of FIG. 3. The Y axis represents battery pack temperature and battery pack temperature increases in the direction of the Y axis arrow. Battery temperature may be sensed or measured via a battery temperature sensor. Horizontal line 302 represents a higher battery temperature range threshold. Horizontal line 304 represents a lower battery temperature range threshold. The desired battery operating range is between high threshold 302 and lower threshold 304.

The second plot from the top of FIG. 3 is a plot of estimated battery pack temperature versus time. The X axis represents time and time increases from the left to right side of FIG. 3. The Y axis represents estimated battery pack temperature and estimated battery pack temperature increases in the direction of the Y axis arrow. Horizontal line 306 represents a higher battery range temperature threshold. Horizontal line 308 represents a lower battery range temperature threshold. The desired battery operating range is between high threshold 306 and lower threshold 308.

The third plot from the top of FIG. 3 is a plot of battery degradation status versus time. The X axis represents time and time increases from the left to right side of FIG. 3. The Y axis represents status of battery pack degradation. A condition of battery pack degradation is indicated when the battery degradation trace is at a higher level. Battery pack degradation is not indicated when the battery degradation trace is at a lower level.

The fourth plot from the top of FIG. 3 is a plot of battery fan speed versus time. The X axis represents time and time increases from the left to right side of FIG. 3. The Y axis represents battery fan speed and battery fan speed increases in the direction of the Y axis arrow. Alternatively, the fourth plot may represent coolant pump speed versus time.

The fifth plot from the top of FIG. 3 is a plot of battery heater state versus time. The X axis represents time and time increases from the left to right side of FIG. 3. The Y axis represents battery heater state. Battery heaters are active when the battery heater state trace is at a higher level. Battery heaters are not active when the battery heater state trace is at a lower level.

The sixth plot from the top of FIG. 3 is a plot of battery electrical power availability status versus time. The battery electrical power availability is an amount of electrical power the battery is permitted to source to a battery load. The battery electrical power availability may also be used to indicate an amount of electrical power the battery is permitted to sink during regenerative vehicle braking or battery charging. The X axis represents time and time increases from the left to right side of FIG. 3. The Y axis represents status of battery pack electrical power availability.

At time T0, the battery is not sourcing or sinking electrical power. Rather, the battery is in a sleep mode and in a vehicle that is not being operated. The sensed battery temperature and estimated battery pack temperatures are at lower levels. The battery temperature is estimated as described in FIG. 4. The battery degradation status is not asserted so there is no indication of battery degradation. The battery fan and heater are off The battery power availability is at a lower level in response to the battery temperature being at a lower level below thresholds 304 and 308.

At time T1, a driver activates the vehicle (not shown) and the battery heaters are activated in response to the vehicle being activated and the low battery temperature. The sensed or measured battery temperature and the estimated battery temperature begin to increase in response to activating the battery heaters. Further, the battery begins sourcing power to the vehicle, thereby increasing battery temperature. The battery's available power begins to increase as the battery temperature increases. The battery degradation status is not asserted so no indication of battery degradation is provided.

Between time T1 and time T2, the battery heater is deactivated in response to battery estimated and sensed temperatures exceeding thresholds 304 and 308. The battery power availability also increases to a higher level in response to sensed battery temperature being within operating ranges between temperatures 302 and 304. The battery degradation status indicator is not asserted and battery degradation is not indicated. Near time T2, the estimated battery temperature begins to increase and the sensed battery temperature remains at a constant level. The estimated battery temperature increases as battery power consumption (not shown) increases. The sensed battery temperature remains steady and it begins to exhibit an in range degradation condition. The battery pack cooling fan speed is adjusted in response to the sensed battery pack temperature when battery pack degradation is not present.

At time T2, the battery degradation status transitions to a higher level to indicate a condition of battery degradation. The battery pack degradation is asserted in response to the sensed battery diverging from the estimated battery temperature. In other words, battery pack degradation is asserted in response to the difference between the estimated battery temperature and the sensed battery pack temperature being greater than a threshold temperature. The vehicle driver may be alerted to the degraded battery state in response to asserting battery degradation. In this example, asserting battery pack degradation causes the battery pack cooling fan speed to be adjusted in response to the highest estimated or sensed battery pack temperature. Since estimated battery temperature is increasing and approaching higher limit 306, battery fan speed is adjusted in response to estimated battery temperature instead of sensed battery temperature. By increasing battery fan speed, the actual battery temperature may be controlled to reduce the possibility of operating the battery at higher temperatures than is desired.

The battery heater remains off since estimated and sensed battery temperatures are above lower battery temperature thresholds 304 and 308. The battery's available power begins to decrease in response to the increasing battery pack temperature estimate, thereby limiting electrical output power of the battery based on the estimated battery temperature. The battery electrical power availability may be reduced via limiting battery output current and/or voltage.

Between time T2 and time T3, the estimated battery temperature increases to a level near higher estimated battery temperature threshold 306 while sensed battery temperature remains constant. The battery degradation status remains asserted indicating the presence of battery degradation. The fan speed is adjusted in response to the estimated battery temperature since it is operating nearest to higher battery temperature threshold 306 and farthest away from a middle level battery operating temperature that is midway between higher temperature threshold 306 and lower temperature threshold 308. The battery heater remains off and the battery pack electrical power availability is initially reduced, but the battery pack electrical power availability increases as the estimated battery temperature decreases near time T3.

At time T3, the driver stops the vehicle and powers the vehicle down (not shown). The driver leaves the vehicle to allowing vehicle temperatures to be reduced toward ambient temperatures.

Between time T3 and time T4, the estimated battery temperature is reduced since the battery is not sourcing or sinking electrical power. However, the sensed battery temperature remains at the middle level in range temperature. The battery degradation status remains in an asserted state and the battery fan speed is reduced to zero since the vehicle is not operating. The battery available power is also reduced in response to the estimated battery temperature being reduced to a level less than lower level 308. The battery heater remains off since the vehicle is powered down and since the battery pack is not sourcing or sinking electrical power.

At time T4, the driver reactivates the vehicle with intent to drive the vehicle away (not shown). The battery heater is activated in response to the vehicle being activated and the estimated battery temperature being less than the lower battery operating range temperature threshold 308. Shortly after time T4, the battery estimated temperature begins to increase in response to the battery heater being activated and the battery souring or sinking electrical power. The battery power availability also increases as the estimated battery temperature increases. The sensed battery temperature remains at a constant level and the battery degradation status remains asserted. After the battery temperature increases above lower temperature threshold 308, the battery heater is deactivated and the battery fan speed is increased.

Referring now to FIG. 4, a method for operating a battery pack in a vehicle is shown. The method of FIG. 4 may be stored in non-transitory memory of a controller as executable instructions in a system as is shown in FIGS. 1 and 2. Further, the method of FIG. 4 may provide an operating sequence as is shown in FIG. 3.

At 402, method 400 samples one or more battery pack temperature sensors and converts the sensor outputs to temperatures via a transfer function of the temperature sensor. The temperature sensor outputs may be a voltage, current, or a digital signal. Method 400 proceeds to 404 after the battery pack temperature is determined via the battery temperature sensor.

At 404, method 400 judges whether or not any input variables for determining estimated battery temperature are suspect of being degraded. An input variable to the estimated battery temperature may be determined to be degraded if one or more sensors sensing battery pack current, fan speed, battery pack voltage, and ambient or battery pack inlet air temperature are degraded. A degraded sensor may be determined via output of the sensor being within a threshold of an output upper or lower limit. Alternatively, a sensor may be determined to be degraded when the sensor does not respond as is expected. If method 400 judges that one or more input variables or sensors providing input to estimated battery temperature is degraded, the answer is yes and method 400 proceeds to 406. Otherwise, the answer is no and method 400 proceeds to 420.

At 406, method 400 compares output of each temperature sensor in the battery pack to the output of other temperature sensors in the battery pack. In one example, the output of all temperature sensors is averaged and output of each temperature sensor is subtracted from the average output of all battery pack temperature sensors. In other examples, the comparison of different temperature sensor outputs may be performed in different ways. For example, if output of one temperature sensor is greater than the median of all battery temperature sensor outputs by more than a predetermined amount, the one temperature sensor may be determined to be degraded. Method 400 proceeds to 408 after outputs of temperature sensors are compared.

At 408, method 400 judges whether or not one or more battery pack temperature sensors are degraded. In one example, a battery pack temperature sensor is determined to be degraded if the absolute value of the average battery pack temperature sensor output minus output of a particular battery pack temperature sensor is greater than a threshold amount. In other examples, a battery temperature sensor is determined to be degraded if the absolute value of a battery temperature sensor output is greater than the median of all battery pack temperature sensor outputs by more than a predetermined amount. If method 400 judges that output of one or more battery pack temperature sensors deviates from the average or median output of other battery pack temperature sensors, the answer is yes and method 400 proceeds to 410. Otherwise, the answer is no and method 400 proceeds to exit.

At 410, method 400 indicates a battery temperature degraded condition. Further, method 400 may indicate which of a plurality of battery pack temperature sensors is providing an output that is not expected. Method 400 proceeds to exit after a degraded battery condition is indicated.

Thus, if the estimated battery temperature is determined to be degraded, degradation of battery temperature sensors may be determined via comparing outputs of other battery temperature sensors with output of a particular battery temperature sensor in question. Consequently, in a first mode battery pack temperature sensor degradation may be determined via comparing output of battery pack temperature sensors against an estimated battery pack temperature. In a second mode, battery pack temperature sensor degradation may be determined via comparing output of a battery pack temperature sensor with outputs of other battery pack temperature sensors. In this way, method 400 may determine degradation of battery pack sensors based on different reference temperatures.

At 420, method 400 estimates battery pack temperature based on battery pack current, voltage, ambient air temperature, and fan speed. In one example, battery pack temperature is estimated according to the following equations:

$$\text{Pack\_Heat\_Generation\_Rate} = V \cdot I - OCV(SOC) \cdot I$$

Where Pack_Heat_Generation_Rate is battery pack heat generation rate, V is battery pack voltage, I is battery pack output (−) or input current (+), OCV is battery pack open circuit voltage as a function of SOC, and SOC is battery pack state of charge.

$$h \cdot (T_{pack\_i} - T_{coolant/air})$$

Where h is the heat transfer coefficient, which may be experimentally determined, $T_{coolant/air}$ is the temperature of air (e.g., ambient air temperature) used to cool the battery pack, and $T_{pack\_i}$ is the ith battery pack temperature. The heat generated by the battery pack is either transferred out of the battery pack or increases the battery pack temperature. Thus, the battery pack temperature can be determined via the following equation via solving for $T_{pack\_i}$:

$$\frac{d}{dt}[C_{p,pack} \cdot T_{pack\_i}] + h \cdot (T_{pack\_i} - T_{coolant/air}) =$$
$$\text{Pack\_Heat\_Generation\_Rate} = V \cdot I - OCV(SOC) \cdot I$$

Where $C_{p,pack}$ is i the battery pack thermal capacity which may be empirically determined, and the remaining variables are as previously described. The heat transfer coefficient may be estimated from the battery pack fan speed according to the equation, for example: $-h=2 \cdot 0.35 \cdot 0.0062 \cdot u \cdot 1.5861 \cdot 0.5 \cdot 8$, where u is the fan speed. Method 400 proceeds to 422 after estimated battery pack temperature is determined.

At 422, method 400 judges whether or not there is a temperature deviation that is greater than a threshold temperature between the estimated battery pack temperature and each of a plurality of the sensed or measured battery pack temperatures. For example, if a battery pack has four temperature sensors and two of the four temperature sensors indicate temperatures that are higher or lower than the estimated temperature by more than a threshold temperature, the answer is yes and method 400 proceeds to 440. Otherwise, the answer is no and method 400 proceeds to 424.

At 424, method 400 judges whether or not there is a deviation between the estimated battery pack temperature and one sensed or measured battery pack temperatures that is greater than a threshold temperature. In one example, the estimated battery pack temperature is subtracted from each of the sensed or measured battery pack temperatures (e.g., the battery pack temperature determined from the battery temperature sensor). If the absolute value of the remainder is greater than a threshold temperature for one battery temperature sensor, the answer is yes and method 400 proceeds to 426. Otherwise, the answer is no and method 400 proceeds to exit. Alternatively, method 400 may judge whether or not one particular temperature sensor is degraded based on first principles based equations using a lumped sum approach for multiple related parameters to detect a most likely degraded single temperature sensor since the chance of two temperature failed at exactly same time are low. If one temperature sensor output is determined degraded the answer is yes and method 400 proceeds to 426. Otherwise, the answer is no and method 400 proceeds to exit.

At 426, method 400 indicates battery pack degradation to a driver. Battery pack degradation may be indicated via a display or an indicator light. Method 400 proceeds to 428 after an indication of battery degradation is output.

At 428, method 400 limits battery pack output electrical power in response to a battery pack temperature. In one example, battery pack output electrical power is limited based on output of a battery pack temperature sensor that is within a predetermined temperature amount of the estimated battery temperature. The output of the battery temperature sensor that is not with a predetermined temperature amount of the estimated battery temperature is ignored.

On the other hand, if no outputs of battery pack temperature sensors are within a predetermined temperature amount of estimated battery temperature, method 400 limits battery pack electrical power output based on output of a battery temperature sensor that is closest to a battery pack lower battery operating range temperature threshold or closest to a battery pack higher operating temperature threshold. For example, if all but one temperature sensor outputs indicate a battery pack temperature is half way between the higher operating threshold temperature and the lower operating temperature threshold while the one temperature sensor output is near the higher operating threshold temperature, battery pack output electrical power is reduced based on output of the one temperature sensor that is near the higher operating threshold temperature.

Alternatively, method 400 limits battery pack electrical output based on a battery pack temperature estimate or the measured battery pack temperature, whichever temperature responds more closely to battery pack operating conditions other than battery temperature. For example, if the battery pack is supplying current to an external load and estimated battery temperature is increasing while measured battery temperature remains constant, battery output power is limited based on estimated battery pack temperature since it follows the expected battery pack temperature profile.

Battery pack power output may be limited by communicating an upper electrical battery power output limit to an external controller that operates an external load that is powered by the battery pack. The external controller limits commands to external electrical loads so that the external load draws no more electrical power than the electrical power limit that was communicated by the battery controller. Alternatively, the battery controller may limit battery pack output electrical power via a current limiting device such as a transistor, SCR, thyristor, or other power limiting device. Method 400 proceeds to 430 after battery output electrical power has been limited.

At 430, method 400 adjusts battery pack cooling fan or cooling pump speed in response to battery pack temperature. In one example, battery pack cooling fan speed is adjusted based on output of a battery pack temperature sensor that is within a predetermined temperature amount of the estimated battery temperature. The output of the battery temperature sensor that is not with a predetermined temperature amount of the estimated battery temperature is ignored.

On the other hand, if no outputs of battery pack temperature sensors are with a predetermined temperature amount of estimated battery temperature, method 400 adjusts battery pack cooling fan speed based on output of a battery temperature sensor that is closest to a battery pack lower battery operating range temperature threshold or closest to a battery pack higher operating temperature threshold. For example, if all but one temperature sensor outputs indicate a battery pack temperature is half way between the higher operating threshold temperature and the lower operating temperature threshold while the one temperature sensor output is near the higher operating threshold temperature, battery cooling fan speed in increased based on output of the one temperature sensor that is near the higher operating threshold temperature.

Alternatively, method 400 adjusts battery pack cooling fan or cooling pump speed based a battery pack temperature estimate or the measured battery pack temperature, whichever temperature responds more closely to battery pack operating conditions other than battery temperature. For example, if the battery pack is supplying current to an external load and estimated battery temperature is increasing while measured battery temperature remains constant, battery pack cooling fan or cooling pump speed is adjusted based on estimated battery pack temperature since it follows the expected battery pack temperature profile. Method 400 proceeds to 432 after battery fan speed has been limited.

At 432, method 400 communicates a battery degradation status to a controller external to the battery pack. In one example, the external controller is a vehicle controller that receives driver input and commands engine and/or motor output based on driver input. Method 400 proceeds to 434 after battery status has been communicated to an external controller.

At 434, method 400 limits vehicle performance based on the communication of battery degradation. In one example, the external controller may limit torque output of a motor in response to battery degradation. Additionally, if the system includes an engine, a vehicle motor may be deactivated and the engine may be activated in response to an indication of battery degradation. Method 400 proceeds to exit after vehicle performance has been limited.

At 440, method 400 determines if thermal leakage is present based in a pattern of battery pack temperature sensors that indicate a temperature that is greater than the estimated battery pack temperature by more than a predetermined amount. In one example, battery temperature sensors are assigned numbers in a temperature sensor table or matrix. For example, a battery pack having four temperature sensors has battery temperatures sensors assigned to temperature sensor table or matrix A in locations $a_{11}$, $a_{12}$, $a_{21}$, $a_{22}$, where $a_{row\ col}$. If output of a particular battery pack temperature sensor deviates from the estimated battery pack temperature by more than a threshold temperature, the location the battery pack temperature sensor is assigned in the temperature sensor table or matrix is filled with a value of one. Otherwise, the location in the temperature sensor table or matrix is assigned a value of zero.

Known battery pack thermal leakage conditions are represented in leakage tables or matrixes that are similar to the temperature sensor tables. The leakage tables contain values of ones and zeros that represent which temperature sensors deviate from the estimated battery pack temperature when thermal leakage is present. Different patterns (e.g., locations of ones and zeros in the leakage table) indicate different battery pack thermal leakage.

The leakage tables are compared to the temperature sensor table. Table locations that are common between the temperature sensor table and the leakage table, and that are asserted as being locations of temperature sensors that deviate from the estimated battery pack temperature, are determined. For example, location $a_{11}$ of the temperature sensor table is compared to location $a_{11}$ of the leakage table. If one pattern of temperature sensors stored in memory matches the pattern of battery pack temperature sensors that indicate a temperature difference between the estimated battery pack temperature and the measured battery pack temperatures that is greater than a threshold temperature, thermal leakage is determined to be present. Method 400 proceeds to 442 after the pattern of temperature sensors that deviate from the estimated battery pack temperature is compared to patterns of temperature sensors that indicate battery pack thermal leakage.

At 442, method 400 judges whether or not thermal leakage is present in the battery pack. In one example, if the asserted (e.g., values of one) entries in the temperature sensor table match asserted entries in one of the leakage tables, the answer is yes and method 400 proceeds to 444. Otherwise, the answer is no and method 400 returns to 424.

At 444, method 400 indicates that a condition of thermal leakage is present in the battery pack. Thermal leakage may be indicated to a driver via a light or a more complex display. Thermal leakage may increase the possibility of battery cell degradation. Therefore, in some examples, battery pack output may be limited as described at 428. Method 400 proceeds to exit after thermal degradation is indicated.

Thus, the method of FIG. 4 provides for a method for operating a battery pack, comprising: adjusting output power of a battery pack in response to a difference between an estimated battery pack temperature and output of a battery pack temperature sensor. The method further comprises adjusting speed of a battery pack cooling fan or cooling pump speed in response to the difference. The method includes where the estimated battery pack temperature is based on battery pack voltage. The method also includes where the estimated battery pack temperature is further based on battery pack output current. The method includes where the estimated battery pack temperature is further based on battery pack cooling fan speed. The method includes where adjusting output power of the battery pack is performed when the difference is greater than a threshold temperature. The method also includes where the estimated battery pack temperature is filtered via a first order filter.

The subject matter of the present disclosure includes all novel and nonobvious combinations and subcombinations of the various systems and configurations, and other features, functions, and/or properties disclosed herein. Further, the described actions, operations, methods, and/or functions may graphically represent code to be programmed into non-transitory memory of the computer readable storage medium in the engine control system.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for operating a battery pack of a vehicle, comprising:
   a battery pack including a temperature sensor; and
   a controller including non-transitory instructions for determining a currently sensed battery pack temperature based on output of the temperature sensor, determining a battery pack fan speed based on output of a sensor sensing fan speed, determining an estimated battery pack temperature based on the battery pack fan speed and not based on the currently sensed battery pack temperature, adjusting battery pack output power in response to a comparison of the estimated battery pack temperature and the currently sensed battery pack temperature, and indicating battery pack degradation in response to the comparison.

2. The system of claim 1, where the comparison includes subtracting the estimated battery pack temperature from the currently sensed battery pack temperature determined via the temperature sensor or vice-versa.

3. The system of claim 1, further comprising additional instructions for indicating degradation of the temperature sensor based on other temperature sensors when one or more inputs to the estimated battery pack temperature are degraded.

4. The system of claim 3, where the estimated battery pack temperature is further based on battery current, voltage, and battery pack thermal capacity.

5. The system of claim 1, where battery pack output power is adjusted via a current limiting device.

6. The system of claim 1, wherein the estimated battery pack temperature is further based on battery pack current, voltage, and ambient air temperature.

* * * * *